United States Patent [19]

Lew

[11] Patent Number: 5,214,965
[45] Date of Patent: Jun. 1, 1993

[54] VORTEX GENERATOR-SENSOR WITH NOISE CANCELLING TRANSDUCER

[76] Inventor: Hyok S. Lew, 7890 Oak St., Arvada, Colo. 80005

[21] Appl. No.: 772,964

[22] Filed: Oct. 8, 1991

[51] Int. Cl.⁵ .................................................. G01F 1/32
[52] U.S. Cl. .................................................. 73/861.24
[58] Field of Search ............ 73/717, 721, 756, 861.22, 73/861.24

[56] References Cited

U.S. PATENT DOCUMENTS

| | | | |
|---|---|---|---|
| 4,062,238 | 12/1977 | Herzl | 73/861.24 |
| 4,161,878 | 7/1979 | Fussell, Jr. | 73/861.24 |
| 4,212,209 | 7/1980 | Newbold et al. | 73/721 |
| 4,257,277 | 3/1981 | Klobe | 73/861.24 |
| 4,440,027 | 4/1984 | Focht | 73/861.24 |
| 4,475,405 | 10/1984 | Corpron | 73/861.24 |
| 4,879,909 | 11/1989 | Lew | 73/861.24 |
| 4,891,988 | 1/1990 | Tada | 73/861.24 |

Primary Examiner—Herbert Goldstein

[57] ABSTRACT

A vortex flowmeter comprises a vortex generating bluff body disposed across a flow passage, and a transducer including a sealed cavity divided into three compartments by a pair of diaphragms and a relative motion sensor detecting relative lateral deflections of the pair of diaphragms away from and towards one another, wherein the middle compartment intermediate the pair of diaphragms includes a pressure communicating hole open to one cylindrical side of the bluff body, while the two side compartments straddling the middle compartment includes a pressure communicating hole open to the other cylindrical side of the bluff body; wherein the fluctuating pressure associated with vortex shedding from the bluff body creates pulsating relative lateral deflections of the pair of diaphragms, that generates an alternating electrical signal representing vortex shedding from the bluff body from the relative motion sensor.

17 Claims, 2 Drawing Sheets

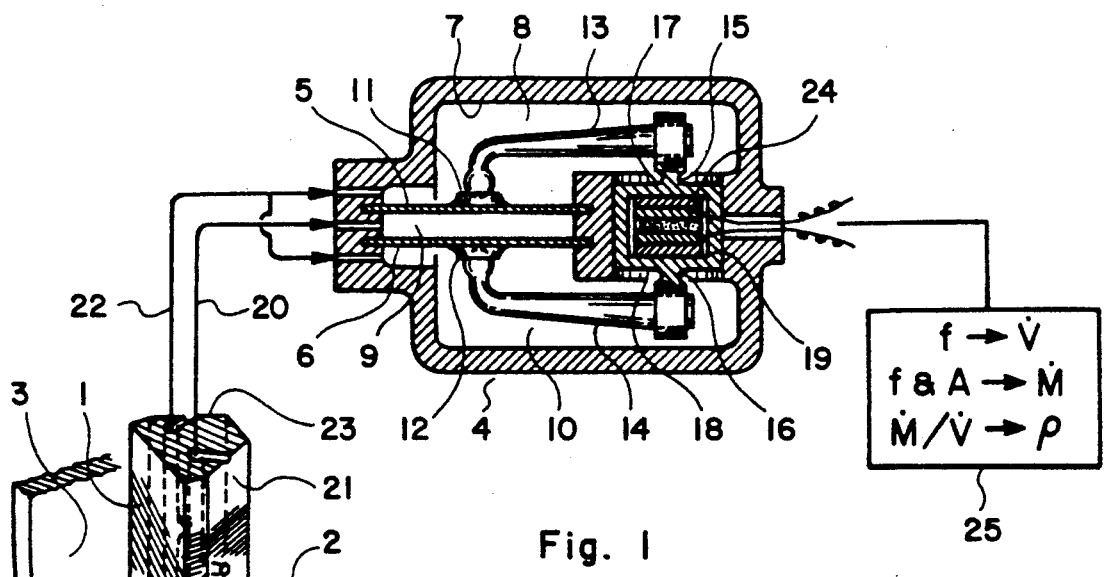
Fig. 1
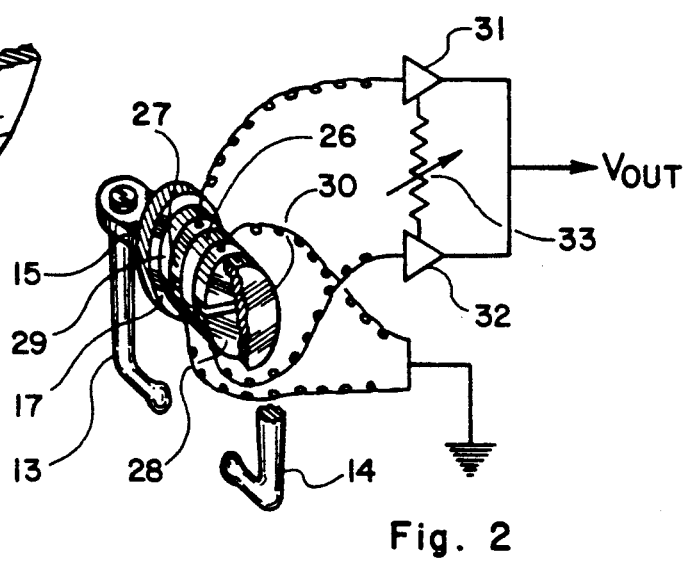
Fig. 2
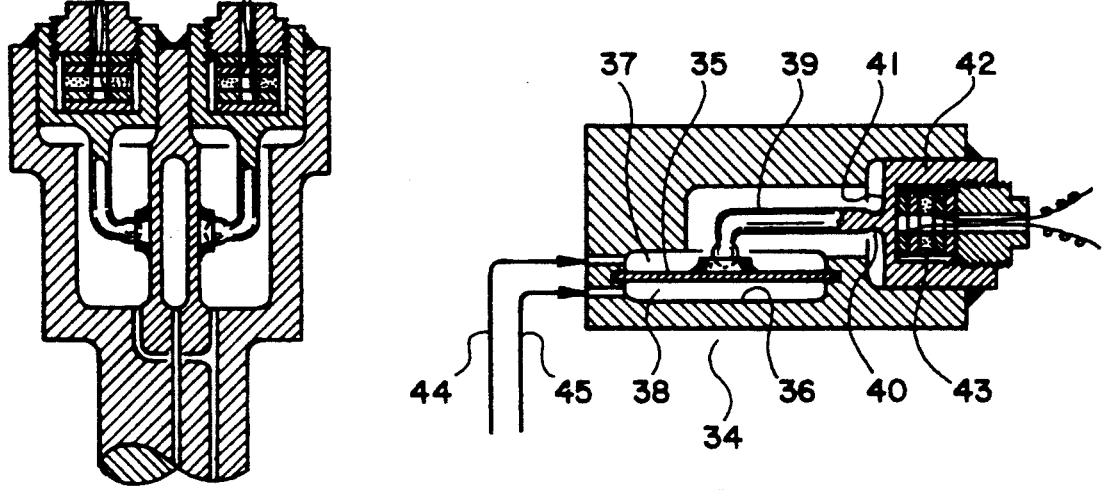
Fig. 3-b
Fig. 3-a

VORTEX GENERATOR-SENSOR WITH NOISE CANCELLING TRANSDUCER

BACKGROUND OF THE INVENTION

A well designed vortex flowmeter measures fluid flow in a range wherein the maximum measurable velocity is nearly one hundred times greater than the minimum measurable velocity, when the noise created by the mechanical vibrations of the flowmeter body and the flow conduit is kept at an extremely low level. In actual applications, the pipe lines carrying the fluid are subjected to mechanical vibrations of sizable intensity as the vibrations of pumps, building structures supporting the pipe lines, flow induced vibrations such as water hammering, flow through nozzles and orifices in the valves and other flow controlling devices become transmitted along the length of the pipe lines. Therefore, a vortex flowmeter measuring fluid flows in industrial applications must have an active noise cancelling device built into the vortex sensor in order to have a high turn-down ratio (ratio of the maximum measurable velocity to the minimum measurable velocity).

BRIEF SUMMARY OF THE INVENTION

The primary object of the present invention is to provide a vortex flowmeter comprising a vortex generating bluff body disposed across a cross section of the flow passage, and a transducer combination including a pair of parallel diaphragms which divide a sealed cavity into three compartments wherein the pair of diaphragms are disposed in a squeezed arrangement between two force transmitting members extending from a piezo electric transducer assembly that converts the opening and closing action of the two force transmitting members into an alternating electrical signal, wherein a first pressure communicating hole transmits the fluid pressure existing at one cylindrical side of the bluff body to the middle compartment between the pair of diaphragms, while a second pressure communicating hole transmits the fluid pressure existing at the other cylindrical side of the bluff body to the two side compartments straddling the middle compartment; whereby the fluctuating fluid pressure existing at the two opposite cylindrical sides of the bluff body oscillating in an alternating mode generate an alternating electrical signal representing vortex shedding from the bluff body from the transducer combination.

Another object of the present invention is to provide a vortex flowmeter comprising a vortex generating bluff body disposed across the flow passage, and a transducer combination including a single diaphragm that divides a sealed cavity into two compartments respectively receiving the fluid pressures existing at the two opposite cylindrical sides of the bluff body by means of two pressure communicating holes, wherein a force transmitting member extending from a piezo electric transducer assembly and biased by the diaphragm at the extremity thereof transmits the fluctuating fluid pressure resulting from vortex shedding from the bluff body to the transducer combination.

A further object of the present invention is to provide a vortex flowmeter comprising a vortex generating bluff body disposed across the flow passage, and a transducer combination including a pair of parallel metallic diaphragms dividing a sealed cavity into three compartments, wherein the middle compartment between the pair of diaphragms receives the fluid pressure existing at one cylindrical side of the bluff body, while the two side compartments straddling the middle compartment receive the fluid pressure existing at the other cylindrical side of the bluff body. The fluctuating value of the electrical capacitance between the pair of metallic diaphragms measured by a capacitance measuring device provides an alternating electrical signal representing vortex shedding from the bluff body as a measure of the rate of fluid flow through the flow passage.

These and other objects of the present invention will become clear as the description thereof progresses.

BRIEF DESCRIPTION OF THE FIGURES

The present invention may be described with a greater clarity and specificity by referring to the following figures:

FIG. 1 illustrates an embodiment of the vortex generator-sensor of the present invention comprising a vortex generating bluff body and a transducer.

FIG. 2 illustrates a cut-out view of an embodiment of the piezo electric transducer usable in constructing the vortex generator-sensor shown in FIG. 1.

FIG. 3a illustrates another embodiment of the piezo electric transducer usable in constructing the vortex generator-sensor of the present invention.

FIG. 3-b illustrates an embodiment of the piezo electric transducer incorporating a combination of the dual diaphragm design shown in FIG. 1 and a pair of piezo electric motion sensor of the type shown in FIG. 3-a.

DESCRIPTION OF THE ILLUSTRATED EMBODIMENTS

Figure 4:
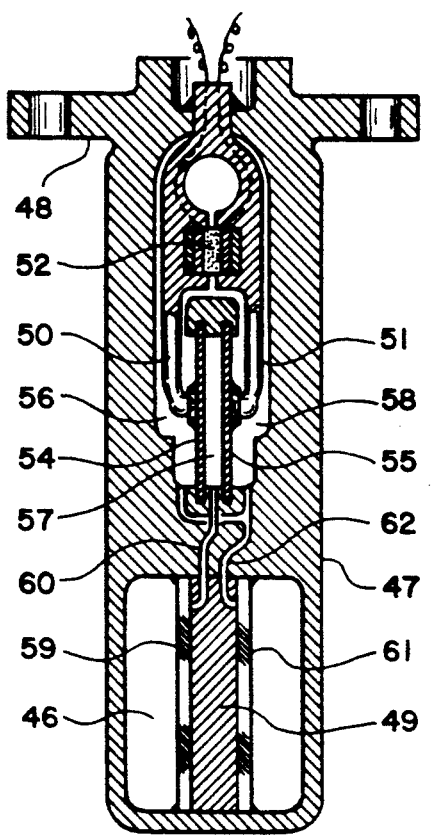
FIG. 4 illustrates another embodiment of the vortex generator-sensor of the present invention as well as a further embodiment of the piezo electric transducer usable in constructing the vortex generator-sensor of the present invention in general.

In FIG. 1 there is illustrated an embodiment of the vortex generator-sensor of the present invention comprising a vortex generating bluff body 1 of an elongated cylindrical shape disposed across a cross section of the flow passage 2 defined by an interior space of the cylindrical wall 3, wherein one or both extremities of the bluff body 1 is secured to the wall 3 of the flow passage 2 or to a rigid body structure supporting the wall 3 of the flow passage 2, and a transducer combination 4 including a pair of diaphragms 5 and 6 disposed in a generally parallel arrangement therebetween, which diaphragms 5 and 6 divide a sealed cavity 7 included in the flowmeter body into three compartments 8, 9 and 10. The pair of diaphragms 5 and 6 include reinforced center portions 11 and 12 biasing the extremities of two force transmitting members 13 and 14 respectively anchored to and extending angularly from two reinforcing ribs 15 and 16 of the two opposite end walls 17 and 18 of the transducer container vessel 19. The two reinforcing ribs 15 and 16 are respectively disposed diametrically across the two end walls 17 and 18 of the transducer container vessel 19 on a reference plane generally perpendicular to a plane formed by the logitudinal axes of the two force transmitting members 13 and 14, and reinforce the end walls 17 and 18 against the pressure force exerted thereon by the piezo electric transducer assembly contained within the transducer container vessel 19 in a squeezed arrangement between the two end walls 17 and 18. A first pressure communicating conduit or hole 20 with one end open to one cylindrical side surface 21 of the bluff body 1 and the other end open to the middle compartment 9 between the pair of diaphragms 5 and 6 transmits the fluid pressure existing at one cylindrical side surface 21 of the bluff body 1 to the middle compartment 9, while a second pressure communicating conduit or hole 22 with one end open to the other cylindrical side surface 23 of the bluff body 1 and the other end open to one or both side compartments 8 and 10 straddling the middle compartment 9 transmits the fluid pressure existing at the other cylindrical side surface 23 of the bluff body 1 to the two side compartments 8 and 10. It is evident that one of the two pressure communicating holes respectively open to the middle compartment 9 and the two side compartments 8 and 10 may be terminated at a location in the fluid stream other than one of the two opposite cylindrical sides surfaces 21 and 23 of the bluff body 1, if an operating condition demands such a revised arrangement. The piezo electric transducer element 24 contained in the transducer container vessel 19 may be one of the following two different designs: The first kind includes a simple piezo electric disc element disposed intermediate the two end walls 17 and 18 in a squeezed arrangement, wherein a relative lateral deflection of the pair of diaphragms 5 and 6 away from or towards one another decompresses or compresses the piezo electric disc element and generates an electrical signal representing the relative lateral deflection of the pair of diaphragms 5 and 6. The second kind includes a piezo electric disc element with each side including a pair of split electrodes respectively disposed on the two opposite sides of the reference plane including the reinforcing ribs 15 and 16, wherein a relative lateral deflection of the pair of diaphragms 5 and 6 away from or towards one another compresses the first half of the piezo electric disc element disposed on one side of the reference plane and decompresses the second half thereof disposed on the other side of the reference plane or vice versa and, consequently, one or more split electrodes of the piezo electric disc element provides an electrical signal representing the relative lateral deflection of the pair of diaphragms 5 and 6. This second kind of the piezo electric transducer will be further described in conjunction with FIG. 2. Now, it has become clear that the alternatively increasing and decreasing fluid pressures existing at the two opposite cylindrical sides surfaces 21 and 23 of the bluff body 1, which fluctuating fluid pressures are created by vortices being shed from the two opposite cylindrical side surfaces of the bluff body in an alternating pattern, push and pull the pair of diaphragms 5 and 6 away from and towards one another at a frequency equal to the frequency of vortex shedding from the bluff body 1 and, consequently, generate an alternating electrical signal from the piezo electric transducer element 24, which alternating electrical signal has a frequency equal to the vortex shedding frequency from the bluff body 1, that is proportional to the velocity of the fluid, and amplitude proportional to the kinetic energy or dynamic pressure of the fluid flow defined as one half of the density of the fluid times the square of the velocity of the fluid. A data processor 25 determines the volume flow rate V or the velocity U of the fluid as a function of the frequency f of the alternating electrical signal, and determines the mass flow rate M as a function of the frequency f and the amplitude A of the alternating electrical signal, which data processor 25 may also determine the density $\rho$ of the fluid as a ratio of the mass flow rate M to the volume flow rate V of the fluid.

In FIG. 2 there is illustrated a cut-out view of the second kind of piezo electric transducer 24 contained within the transducer container vessel 19 employed in the embodiment shown in FIG. 1. The piezo electric transducer comprises a piezo electric disc element 26 sandwiched between a pair of split electrode discs 27 and 28, and a pair of insulator disc 29 and 30, which transducer assembly is disposed between the two relatively thin end walls 17 and 18 of the transducer container vessel 19 of a cylindrical shape (the end wall 18 is not shown in this cut-out view as it is cut away in this view). Each of the two split electrode discs 27 and 28 includes a pair of semicircular electrodes respectively disposed on the two opposite sides of the reference plane including the reinforcing ribs 15 and 16 (the reinforcing rib 16 is not shown in this cut-out view as it is cut away in this view). It is readily recognized that the opening and closing movement of the two elongated force transmitting members 13 and 14 resulting from the relative lateral deflections of the pair of diaphragms 5 and 6 produces twisting movements of the two end walls 17 and 18 of the transducer container vessel 19 respectively about two axes coinciding with the lines of the intersection between the reference plane and the two end walls 17 and 18, respectively. One electrode disposed at one side of the piezo electric disc element 26 on one side of the reference plane and another electrode disposed at the other side of the piezo electric disc element 26 on the other side of the reference plane are respectively connected to a pair of amplifiers 31 and 32 with a signal level balancing means 33 therebetween, while the other electrodes not connected to the amplifiers 31 or 32 are grounded. The two electrical signals respectively supplied to the two amplifiers 31 and 32 are combined in such a way that the noise created by the mechanical vibration of the transducer assembly is cancelled therebetween and an alternating output electrical signal $V_{out}$ representing vortex shedding from the bluff body is obtained, which alternating output electrical signal is then supplied to a data processor such as the element 25 included in the embodiment shown in FIG. 1. As an alternative in the design, two semicircular electrodes included at the same side of the piezo electric disc element 26 and respectively disposed on the two opposite sides of the reference plane may be connected to an inverting and a noninverting amplifier with a signal level balancing means therebetween, wherein the two electrical signals supplied to the two amplifiers are additively combined, or the above-mentioned two electrodes may be connected to a pair of noninverting amplifiers with a signal level balancing means therebetween, wherein the two electrical signals supplied to the two amplifiers are differentially combined. It is readily realized that the first kind of piezo electric transducer 24 mentioned in conjunction with FIG. 1 results in when the pair of split electrodes 27 and 28 are replaced with a pair of nonsplit electrodes respectively connected to a pair of amplifiers with a signal level balancing means therebetween.

In FIG. 3a there is illustrated another embodiment of the piezo electric transducer combination usable in constructing the vortex generator-sensor of the present invention in place of the piezo electric transducer combination included in the embodiment shown in FIG. 1. This transducer combination 34 comprises a single diaphragm 35 dividing a sealed cavity 36 into two compartments 37 and 38. The reinforced center portion of the diaphragm 35 biases the extremity of the force transmitting member 39 extending from a reinforcing rib 40 included in the end wall 41 of the transducer container vessel 42, that contains a piezo electric disc element 43 sandwiched between a pair of split electrode discs and a pair of insulator discs as described in conjunction with FIG. 2, which combination of the transducer elements is pressed onto the end wall 41. The two pressure communicating conduits or holes 44 and 45 respectively extending from the two compartments 37 and 38 are open to the two opposite cylindrical sides of the vortex generating bluff body, as shown in FIG. 1. It is readily realized that a pair of the piezo electric transducer assemblies shown in FIG. 3a can be employed in place of the single piezo electric transducer assembly shown in FIG. 1 in constructing the vortex generator-sensor illustrated in FIG. 1.

In FIG. 3-b there is illustrated an embodiment of the piezo electric transducer employing a combination of the dual diaphragm design shown in FIG. 1 and a pair of piezo electric motion sensors of the type shown in FIG. 3-a, which pair of motion sensors now replaces the single piezo electric relative motion sensor included in the embodiment shown in FIG. 1.

In FIG. 4 there is illustrated another embodiment of the vortex generator-sensor of the present invention, that provides a vortex flowmeter of the insertion type, while the embodiment shown in FIG. 1 provides a vortex flowmeter of the inline type. Of course, the embodiments shown in FIGS. 1 and 4 can be easily revised to convert them from an insertion type to an inline type and vice versa. A flow passage 46 is included in one extremity of an elongated support member 47 extending into the midstream of fluid flow, while the other extremity of the elongated support member 47 includes anchoring means 48 such as a mounting flange for securing the elongated support member to a rigid reference structure such as a pipe wall. The vortex generating bluff body 49 is disposed across a cross section of the flow passage 46 and secured to the wall of the flow passage 46 at both extremities thereof. While this embodiment of the vortex generator-sensor as well as the embodiment shown in FIG. 1 can employ any one of the various embodiments of the transducer combinations shown in FIGS. 1-9, this particular illustrative embodiment comprises a transducer combination including a piezo electric relative motion sensor that has a pair of elongated force transmitting members 50 and 51, which are connected to one another at the first extremities thereof and anchored to the elongated support member 47 thereat. A transducer assembly including a piezo electric disc element 52 sandwiched between a pair of nonsplit electrode discs and a pair of insulator discs is disposed between the two elongated force transmitting members 51 and 52 intermediate the two extremities thereof in a squeezed relationship therebetween. The free ends of the two elongated force transmitting members 50 and 51 are respectively biased by a pair of diaphragms 54 and 55 dividing a sealed compartment into three compartments 56, 57 and 58, wherein the middle compartment 57 receives the fluid pressure existing at one cylindrical side 59 of the bluff body 49 by means of the pressure communicating hole 60 and one or both of the two side compartments 56 and 58 receive the fluid pressure existing at the other cylindrical side 61 of the bluff body 49 by means of the pressure communicating hole 62. The two electrical signals respectively supplied by the two nonsplit electrode discs sandwiching the piezo electric disc element 52 may be combined additively or differentially to cancel out the noise therebetween and obtain a refined signal representing vortex shedding from the bluff body. It should be mentioned that the two electrical signals provided by the two electrodes respectively connected to the two amplifiers shown in FIGS. 1, 2 or 3 can also be combined differentially instead of additively.

Figure 5:
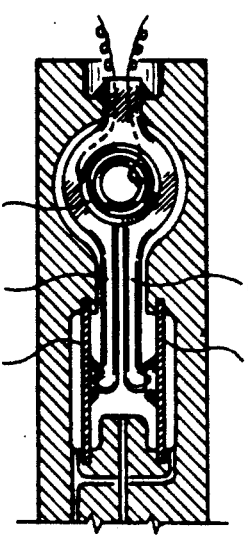
FIG. 5 illustrates yet another embodiment of the piezo electric transducer usable in constructing the vortex generator-sensor of the present invention.

In FIG. 5 there is illustrated a further embodiment of the piezo electric transducer combination usable in constructing the vortex generator-sensor of the present invention, which has essentially the same construction as that of the piezo electric transducer combination included in the embodiment shown in FIG. 4 with two exceptions, which exceptions are firstly, the circular cylindrical shell piezo electric element 63 with inner and outer cylindrical shell electrodes disposed in a circular cylindrical cavity between the two elongated force transmitting members 64 and 65 is now employed in place of the piezo electric disc element 52 included in the embodiment shown in FIG. 4, and secondly, the two extremities of the two elongated force transmitting members 64 and 65 respectively biased by the two diaphragms 66 and 67 are disposed intermediate the two diaphragms rather than straddling the two diaphragms as shown in FIG. 4.

Figure 6:
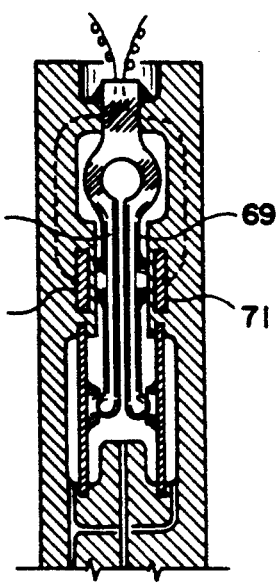
FIG. 6 illustrates yet a further embodiment of the piezo electric transducer usable in constructing the vortex generator-sensor of the present invention.

In FIG. 6 there is illustrated yet another embodiment of the piezo electric transducer combination usable in constructing the vortex generator-sensor of the present invention. This embodiment of the piezo electric transducer combination has essentially the same construction as that of the embodiment shown in FIG. 4 with one exception being that each of the pair of force transmitting members 68 and 69 has a protrusion intermediate the two extremities thereof that compresses a thin wall covering each of a pair of piezo electric disc elements 70 and 71, which combination now replaces the piezo electric disc element 52 included in the transducer combination shown in FIG. 4.

Figure 7:
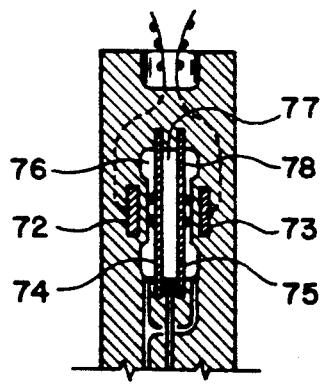
FIG. 7 illustrates still another embodiment of the piezo electric transducer usable in constructing the vortex generator-sensor of the present invention.

In FIG. 7 there is illustrated yet a further embodiment of the transducer combination usable in constructing the vortex generator-sensor of the present invention, which combination employs a pair of piezo electric disc elements 72 and 73 under a pressurized contact respectively with the reinforced center portions of the two diaphragms 74 and 75 dividing the sealed cavity into three pressure compartments 76, 77 and 78.

Figure 8:
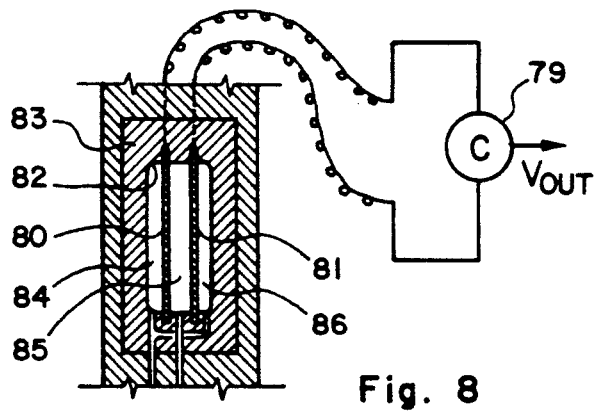
FIG. 8 illustrates an embodiment of the capacitive transducer usable in constructing the vortex generator-sensor of the present invention.

In FIG. 8 there is illustrated an embodiment of the transducer combination of capacitive type usable in constructing the vortex generator-sensor of the present invention, wherein a device 79 measuring the electrical capacitance between the two metallic diaphragms 80 and 81, which divide the sealed cavity 82 included in an insert block 83 made of an electrically insulating material and fitted into a metallic support member 83 into three compartments 82, 83 and 84, converts the relative lateral deflection of the two diaphragms 80 and 81 into an alternating output electrical signal $V_{OUT}$ representing vortex shedding from the vortex generating bluff body.

Figure 9:
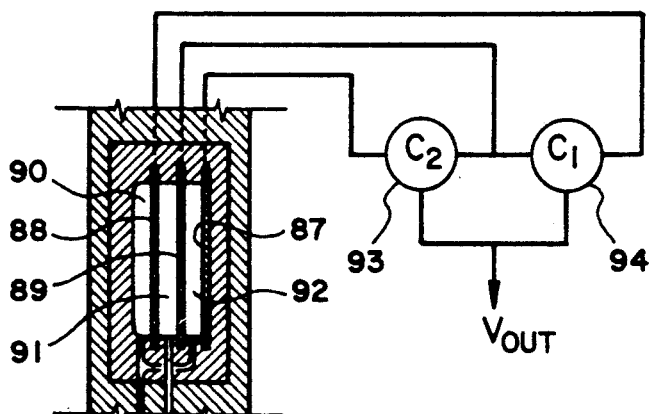
FIG. 9 illustrates another embodiment of the capacitive transducer usable in constructing the vortex generator-sensor of the present invention.

In FIG. 9 there is illustrated another embodiment of the capacitive type transducer combination, that is a modification of the embodiment shown in FIG. 8. In this embodiment, a metallic planar member 87 is rigidly affixed to one side wall of the sealed cavity in a parallel arrangement to the pair of metallic diaphragms 88 and 89 dividing the sealed cavity into the three compartments 90, 91 and 92. A pair of electrical capacitance measuring divices 93 and 94 respectively measuring the electrical capacitance between the diaphragms 88 and 89, and the electrical capacitance between the diaphragm 89 and the planar member 87 provide an alternating output electrical signal representing vortex shedding from the bluff body, which alternating output elelctrical signal can be either a differential combination of or a ratio between the two electrical capacitances measured by the two divices 93 and 94.

As the concluding remarks on the specification of the invention, it should be mentioned that all of the embodiments of the transducer shown and described with the exception of that shown in FIG. 3 have symmetric constructions about a plane intermediate and parallel to the two diaphragms dividing the sealed cavity into the three compartments. As the inertia forces associated with the mechanical vibrations of the transducer combination in directions lateral to the diaphragms create deflections of the two diaphragms and the two force transmitting members in an antisymmetric pattern about the plane of the structural symmetry (the mechanical vibrations in directions parallel to the diaphragms have no consequence), the mechanical vibrations generate either negligibly low noise or sizable noise of a relative polarity between the two electrical signals respectively supplied by the pair of electrodes included in the transducer element, which relative polarity is opposite to the relative polarity between the same two electrical signals generated by the fluctuating fluid pressure created by the vortex shedding from the bluff body, that creates deflections of the two diaphragms and the two force transmitting members in a symmetric pattern about the plane of the structural symmetry. In other words, if the two noise-generated signals respectively supplied by the two electrodes included in the transducer element have the same sign, the two vortex-generated signals supplied by the same two electrodes have the two opposite signs, and vice versa. As a consequence, the two electrical signals generated by the combination of the noise and vortices and supplied by the two electrodes included in the transducer combination can be combined either additively or differentially to cancel the noise-generated components therebetween and obtain an output signal including mostly the vortex-generated component as demonstrated by the embodiment shown in FIG. 2. As a vortex flowmeter lives or dies by its ability or inability to reject the noise generated by mechanical vibrations and to provide a sufficiently pure vortex-generated signal, the symmetric construction of the two diaphragms and the two force transmitting members about the plane of symmetry intermediate and parallel to the two diaphragms is one of the two most important new features of the present invention, while the other of the two most important features is the two force transmitting members of elongated structure amplifying the alternating mechanical force created by the pulsating diaphragms in the transmission thereof to the piezo electric transducer element, which amplification provides the capability to measure very low flow velocities whereat the vortex-generated fluctuation in the fluid pressure is very weak. The embodiment shown in FIG. 3 is an economic version, that can be used to construct a vortex flowmeter operating under nearly vibration-free environments.

While the principles of the present inventions have now been made clear by the illustrative embodiments, there will be many modifications of the structures, arrangements, proportions, elements and materials, which are immediately obvious to those skilled in the art and particularly adapted to the specific working environments and operating conditions in the practice of the invention without departing from those principles. It is not desired to limit the invention to the particular illustrative embodiments shown and described, and accordingly, all suitable modifications and equivalents may be regarded as falling within the scope of the invention as defined by the claims which follow.

The embodiments of the invention, in which an exclusive property or priviledge is claimed, are defined as follows:

1. An apparatus for measuring flow rate of fluid comprising in combination:
   a) a vortex generator of an elongated cylindrical shape disposed at least partially across a flow passage, said vortex generator including a first pressure transmitting hole with one extremity including at least one opening open to a first cylindrical side surface of the vortex generator and a second pressure transmitting hole with one extremity including at least one opening open to a second cylindrical side surface of the vortex generator opposite to said first cylindrical side surface;
   b) a transducer body including a first pressure compartment with two opposite end walls provided by two thin planar members, and a second pressure compartment straddling the combination of the two thin planar members and the first pressure compartment, wherein the other extremity of the first pressure transmitting hole included in the vortex generator is open to the first pressure compartment and the other extremity of the second pressure transmitting hole included in the vortex generator is open to the second pressure compartment; and
   c) a transducer means for converting a relative flexural vibration between the two thin planar members into a fluctuating electrical signal representing vortex shedding from the vortex generator.

2. An apparatus as defined in claim 1 wherein said combination includes means for determining volume flow rate of fluid as a function of frequency of the fluctuating electrical signal.

3. An apparatus as defined in claim 1 wherein said combination includes means for determining mass flow rate of fluid as a function of frequency and amplitude of fluctuation of the fluctuating electrical signal.

4. An apparatus as defined in claim 1 wherein said combination includes means for determining density of fluid as a ratio of mass flow rate of the fluid determined as a function of frequency and amplitude of fluctuation of the fluctuating electrical signal to volume flow rate of the fluid determined as a function of the frequency of the fluctuating electrical signal.

5. An apparatus as defined in claim 1 wherein said transducer means comprises a piezo electric relative motion sensor including:
a) a transducer container vessel secured to the transducer body and having a closed cavity with two opposite thin walls disposed approximately parallel to a plane of symmetry located intermediate the two thin planar members in a parallel relationship;
b) a piezo electric disc element disposed within the closed cavity of the transducer container vessel on a plane approximately parallel to said plane of symmetry intermediate the two opposite thin walls of the closed cavity in a compressed relationship therebetween, said piezo electric disc element extending across a reference plane perpendicular to said plane of symmetry and intersecting with the two opposite thin walls of the closed cavity in a perpendicular relationship, and including at least two electrodes respectively located on two opposite sides of said reference plane;
c) two elongated force transmitting members respectively disposed next to the two opposite thin walls of the closed cavity and extending away from said reference plane, each of the two elongated force transmitting members including an angled first extremity disposed on said reference plane and secured to each of the two opposite thin walls of the closed cavity, and an over-hanging second extremity under a pressurized contact with each of the two thin planar members; and
d) means for combining two electrical signals respectively supplied by said at least two electrodes, wherein noise is cancelled between the two electrical signals and a refined fluctuating output electrical signal representing vortex shedding from the vortex generator is obtained.

6. An apparatus as defined in claim 1 wherein said transducer means comprises two piezo electric motion sensors, each of said two piezo electric motion sensors including:
a) a transducer container vessel secured to the transducer body and having a closed cavity with a thin end wall disposed approximately perpendicular to a plane of symmetry located intermediate the two thin planar members in a parallel relationship;
b) a piezo electric disc element disposed within the closed cavity of the transducer container vessel on a plane approximately parallel to the thin end wall of the closed cavity in a compressed relationship against the thin end wall of the closed cavity, said piezo electric disc element extending across a reference plane parallel to said plane of symmetry and intersecting with the thin end wall of the closed cavity in a perpendicular relationship, and including at least two electrodes respectively located on two opposite sides of said reference plane;
c) an elongated force transmitting member extending from the thin end wall of the closed cavity, said elongated force transmitting member including a first extremity disposed on said reference plane and secured to the thin end wall of the closed cavity, and an over-hanging second extremity under a pressurized contact with each of the two thin planar members; and
d) means for combining two electrical signals respectively supplied by said at least two electrodes, wherein noise is cancelled out between the two electrical signals and a resultant electrical signal representing flexural vibration of each of the two thin planar members is obtained.

7. An apparatus as defined in claim 6 wherein said combination includes an electric circuit means for combining the two resultant electrical signals respectively supplied by the two piezo electric motion sensors, wherein noise is cancelled between the two resultant electrical signals and a refined fluctuating output electrical signal representing vortex shedding from the vortex generator is obtained.

8. An apparatus as defined in claim 1 wherein said transducer means comprises a piezo electric relative motion sensor including two elongated force transmitting members with first extremities thereof connected to one another and secured to the transducer body, and second extremities thereof respectively under a pressurized contact with the two thin planar members, and a piezo electric disc element disposed intermediate the two elongated force transmitting members in a compressed relationship; wherein said piezo electric disc element provides the fluctuating electrical signal representing vortex shedding from the vortex generator.

9. An apparatus as defined in claim 1 wherein said transducer means comprises a piezo electric relative motion sensor including two elongated force transmitting members with first extremities thereof connected to one another and secured to the transducer body, and second extremities thereof respectively under a pressurized contact with the two thin planar members, and a circular cylindrical shell piezo electric element disposed intermediate the two elongated force transmitting members in a constricting relationship; wherein said circular cylindrical shell piezo electric element provides the fluctuating electrical signal representing vortex shedding from the vortex generator.

10. An apparatus as defined in claim 1 wherein said transducer means comprises a piezo electric relative motion sensor including two elongated force transmitting members with first exremities thereof connected to one another and secured to the transducer body, and second extremities thereof respectively under a pressurized contact with the two thin planar members; a first piezo electric element disposed intermediate the transducer body and one of the two elongated force transmitting members in a compressed relationship; and a second piezo electric element disposed intermediate the transducer body and the other of the two elongated force transmitting members in a compressed relationship, and further comprises an electric circuit means for combining two electrical signals respectively supplied by the first and second piezo electric elements; wherein noise is cancelled between the two electrical signals and a refined fluctuating output electrical signal representing vortex shedding from the vortex generator is obtained.

11. An apparatus as defined in claim 1 wherein said transducer means comprises a first piezo electric element disposed intermediate the transducer body and one of the two thin planar members in a compressed relationship, and a second piezo electric element disposed intermediate the transducer body and the other of the two thin planar members in a compressed relationship, and further comprises an electric circuit means for combining two electrical signals respectively supplied by the first and second piezo electric elements; wherein noise is cancelled between the two electrical signals and a refined fluctuating output electrical signal representing vortex shedding from the vortex generator is obtained.

12. An apparatus as defined in claim 1 wherein the two thin planar members are made of a metal, and said transducer means comprises an electric circuit means measuring electrical capacitance between the two thin planar members; wherein said electric circuit means provides the fluctuating electrical signal representing vortex shedding from the vortex generator.

13. An apparatus as defined in claim 1 wherein the two thin planar members are made of a metal, and said combination includes a third metallic planar member affixed to the transducer body in a parallel and spaced relationship with respect to the two thin planar members, and further includes electric circuit means for measuring electrical capacitance between the two thin planar members and electrical capacitance between the third metallic planar member and one of the two thin planar members; wherein said electric circuit means provides a ratio of the electrical capacitance between the two thin planar members to the electrical capacitance between the third metallic planar member and one of the two thin planar members as the fluctuating electrical signal representing vortex shedding from the vortex generator.

14. An apparatus for measuring flow rate of fluid comprising in combination:
   a) a vortex generator of an elongated cylindrical shape disposed at least partially across a flow passage, said vortex generator including a first pressure transmitting hole with one extremity including at least one opening open to a first cylindrical side surface of the vortex generator and a second pressure transmitting hole with one extremity including at least one opening open to a second cylindrical side surface of the vortex generator opposite to said first cylindrical side surface;
   b) a transducer body including a first and second pressure compartment separated from one another by a thin planar member constituting a partitioning wall therebetween, wherein the other extremity of the first pressure transmitting hole included in the vortex generator is open to the first pressure compartment, and the other extremity of the second pressure transmitting hole included in the vortex generator is open to the second pressure compartment; and
   c) a piezo electric motion sensor including:
      1) a transducer container vessel secured to the transducer body and having a closed cavity with a thin end wall disposed approximately perpendicular to the thin planar member;
      2) a piezo electric disc element disposed within the closed cavity of the transducer container vessel on a plane parallel to the thin end wall of the closed cavity, said piezo electric disc element extending across a reference plane approximately parallel to the thin planar member and intersecting with the thin end wall of the closed cavity in a perpendicular relationship, and including at least two electrodes respectively located on two opposite sides of said reference plane;
      3) an elongated force transmitting member extending from the thin end wall of the closed cavity, said elongated force transmitting member including a first extremity disposed on said reference plane and secured to the thin end wall of the closed cavity, and an over-hanging second extremity under a pressurized contact with the thin planar member; and
      4) means for combining two electrical signals respectively supplied by said at least two electrodes, wherein noise is cancelled between the two electrical signals and a refined fluctuating output electrical signal representing vortex shedding from the vortex generator is obtained.

15. An apparatus as defined in claim 14 wherein said combination includes means for determining volume flow rate of fluid as a function of frequency of the fluctuating output electrical signal.

16. An apparatus as defined in claim 14 wherein said combination includes means for determining mass flow rate of fluid as a function of frequency and amplitude of fluctuation of the fluctuating output electrical signal.

17. An apparatus as defined in claim 14 wherein said combination includes means for determining density of fluid as a ratio of mass flow rate of the fluid determined as a function of frequency and amplitude of fluctuation of the fluctuating output electrical signal to volume flow rate of the fluid determined as a function of the frequency of the fluctuating output electrical signal.

* * * * *